(12) United States Patent
Ono et al.

(10) Patent No.: US 6,223,027 B1
(45) Date of Patent: Apr. 24, 2001

(54) IMAGE DATA TRANSMISSION SYSTEM AND METHOD

(75) Inventors: Fumitaka Ono; Junichi Sadamatsu; Hitoshi Kubota; Yoshihiro Ashizaki; Koji Kaneko; Akira Kotani; Toshiyuki Takahashi; Yoichi Tenda; Atsushi Tanaka; Kunio Ueda, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/145,645

(22) Filed: Sep. 2, 1998

(30) Foreign Application Priority Data

Sep. 19, 1997 (JP) .................................................... 9-254458

(51) Int. Cl.⁷ .................................................. H04M 11/10
(52) U.S. Cl. ............................................ 455/412; 455/517
(58) Field of Search ............................... 455/517, 507, 455/412, 39, 500

(56) References Cited

U.S. PATENT DOCUMENTS 5,596,318 * 1/1997 Mitchell ................................. 455/15

FOREIGN PATENT DOCUMENTS 8194447 7/1996 (JP) .

* cited by examiner

Primary Examiner—Nguyen T. Vo
(74) Attorney, Agent, or Firm—Leydig, Voit & Mayer, Ltd.

(57) ABSTRACT

An image data transmission system includes mobile transceivers having memories storing image data that is organized in sequential blocks. The mobile transceivers sequentially pass by a stationary transceiver and pause proximate the stationary transceiver. While pausing, a mobile transceiver transmits a block of the image data to the stationary transceiver, which receives and stores the transmitted data. Data transmission is interrupted by movement of the formerly pausing mobile transceiver. The stationary transceiver transmits a pointer signal to a paused mobile transceiver indicating which blocks of image data have been stored in the stationary transceiver so that the mobile transceivers transmit the blocks sequentially until all blocks have been received and stored by the stationary transceiver. The apparatus may be employed in a mass transit system, such as a subway or commuter train, in which the mobile transceivers are mounted in train cars and the stationary transceiver is located at a station. The image data may be used to illuminate electronic displays in the station each time all of the blocks of data have been transmitted to and stored in the stationary transceiver. Thus, the vehicles containing the mobile transceivers function as a transmission line and can provide continually updated data for news and advertisement displays.

12 Claims, 9 Drawing Sheets

IMAGE DATA TRANSMISSION SYSTEM AND METHOD

BACKGROUND OF INVENTION

1. Field of the Invention

The present invention relates to an image data transmission system and method in which mobile vehicles equipped with transceivers, i.e., mobile transceivers, are used as a transmission line for transmitting image data to respective stationary transceivers.

2. Description of the Prior Art

Figure 1:
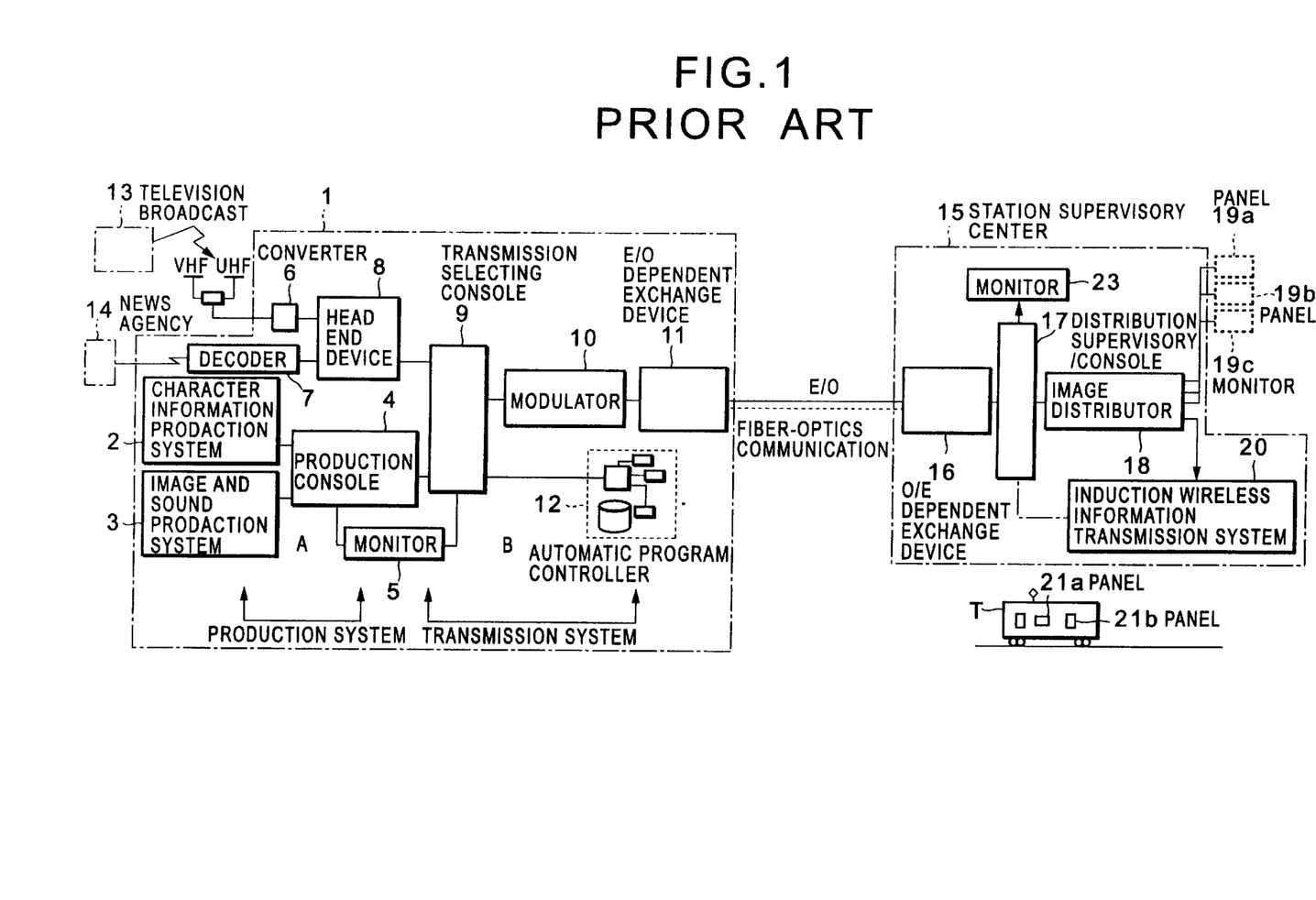
FIG. 1 is a block diagram illustrating an example of a conventional image data transmission system.
Figure 2:
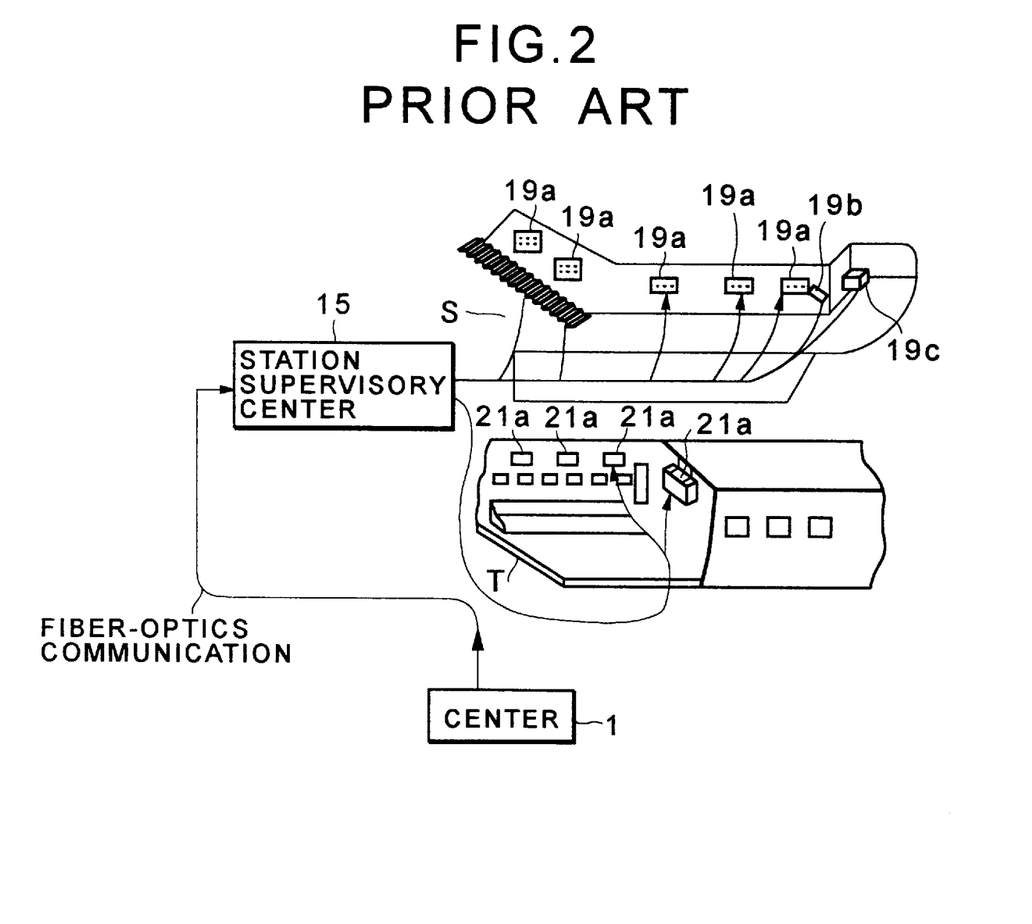
FIG. 2 is a schematic description of the conventional image data transmission system of FIG. 1 applied to a subway system.
Figure 3:
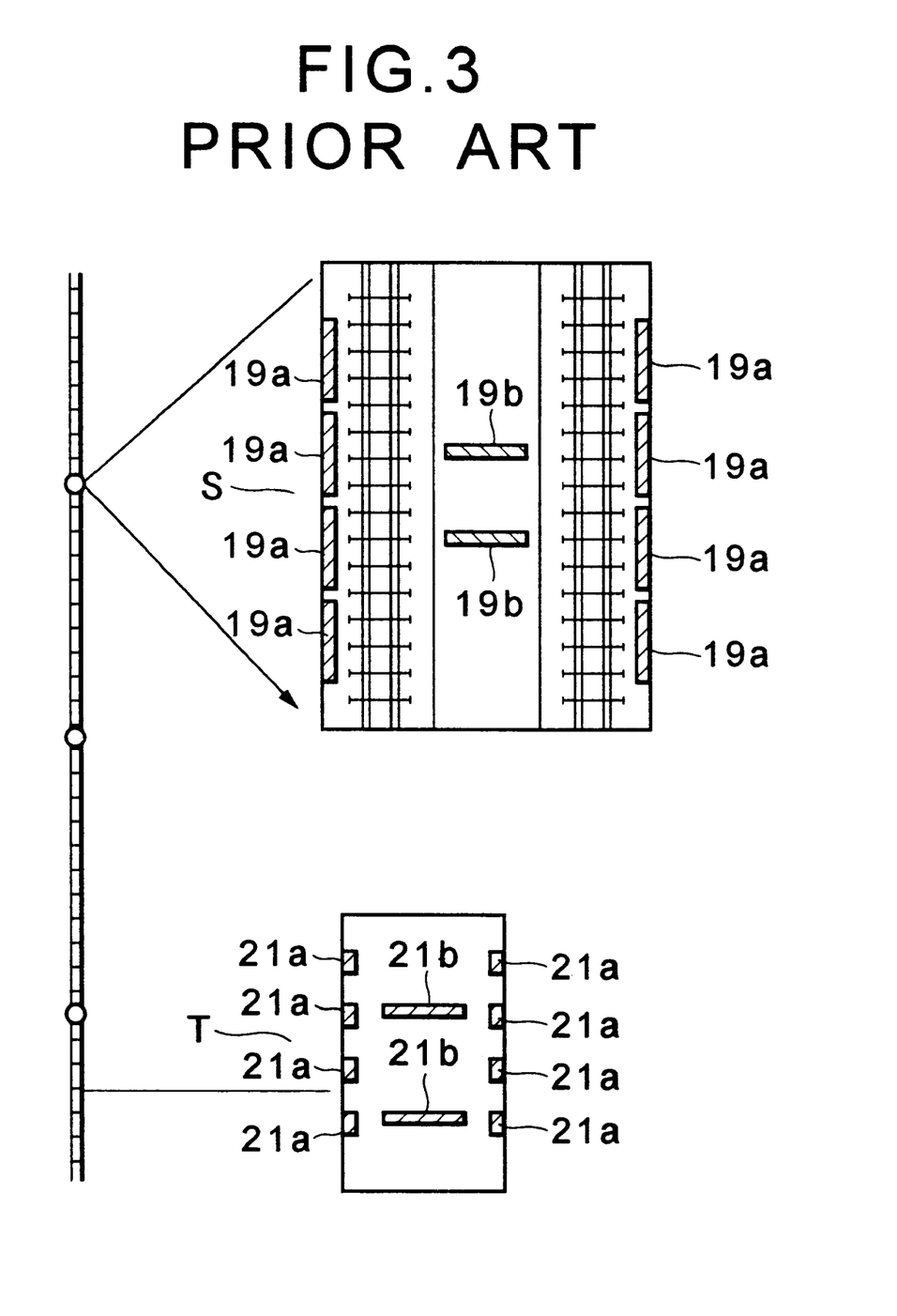
FIG. 3 is a schematic description of the conventional image data transmission system of FIG. 1 applied to a subway system.

An image data transmission system for a conventional electronic advertisement panel is disclosed in Japanese Unexamined Patent Publication No. 4-55513 and is described briefly below. FIG. 1 is a block diagram of a conventional image data transmission system schematically illustrating transmission in a subway yard. The system includes an information transmission center 1 having a production system A and a transmission system B. The production system A includes a character information production system 2, an image and sound production system 3, and a production console 4 to which the character information production system 2 and the image and sound production system 3 are connected. The production console 4 is connected to a transmission selecting console 9 in the transmission system B and to a monitor 5.

The transmission system B comprises a converter 6, a decoder 7, and a head end device 8 to which the converter 6 and the decoder 7 are connected. The transmission selecting console 9, connected to the head end device 8, selects and transmits information. A modulator 10 is connected to the transmission selecting console 9. An E/O dependent exchange device 11 is connected to the modulator 10 and to an O/E dependent exchange device 16 in a station supervisory center 15 through an optical fiber, and an automatic program controller 12 is connected to the transmission selecting console 9. The transmission selecting console 9 is also connected to the monitor 5.

The converter 6 receives radio waves from an existing television broadcasting station 13. The decoder 7 converts information entered at a newspaper company and news agency 14. The station supervisory center 15 in each railroad station comprises the O/E dependent exchange device 16 connected to the E/O dependent exchange device 11 in the information transmission center 1 through the optical fiber, a distribution supervisory console 17 connected to the O/E dependent exchange device 16, an image distributor 18 connected to the distribution supervisory console 17 to distribute advertisement data to respective electronic advertisement panels 19a and 19b, and a monitor 19c, including a video projector or the like, in the subway yard. An inductive wireless information transmission system 20 is connected to the image distributor 18 and the distribution supervisory console 17 to transmit information to electronic advertisement panels 21a and 21b in moving trains. The distribution supervisory console 17 is connected to a monitor line 23. In this drawing, T indicates a train and S indicates a subway station.

Figure 4:
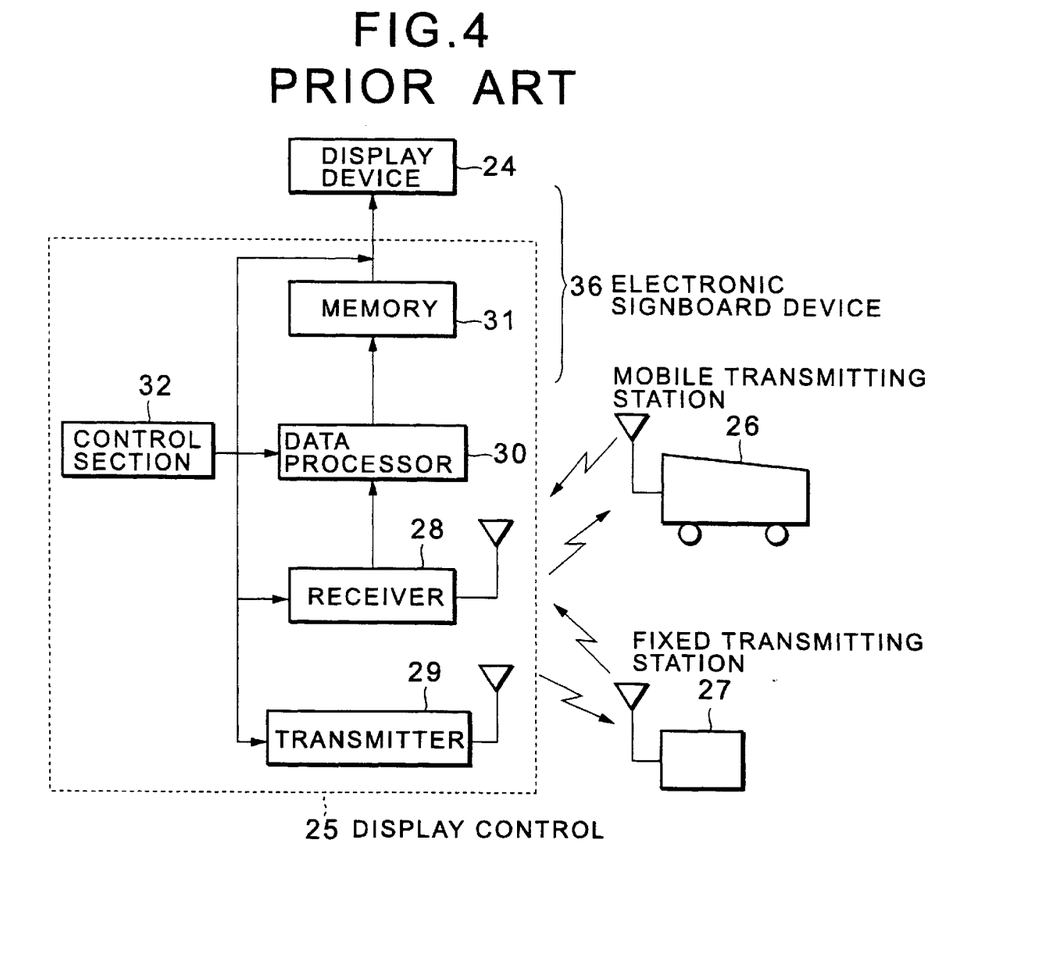
FIG. 4 is a block diagram illustrating another example of a conventional image data transmission system.

FIG. 4 is a block diagram illustrating a second conventional transmission system including a display device 24, i.e., a signboard, a display control 25, a mobile transmitting station 26, and a fixed transmitting station 27. The display control 25 comprises a receiver 28 for receiving advertisement data transmitted from the transmitting station 26 or from the fixed transmitting station 27, a transmitter 29 for transmitting information to the mobile transmitting station 26 or to the fixed transmitting station 27, a data processor 30 for processing the received data, a memory 31 for storing the processed data, and a control section 32 for controlling the receiver 28, the transmitter 29, the data processor 30, and the memory 31. The data is transmitted by means of radio waves or light. The display device 24 and the display control 25 constitute an electronic signboard device 36.

Figure 5:
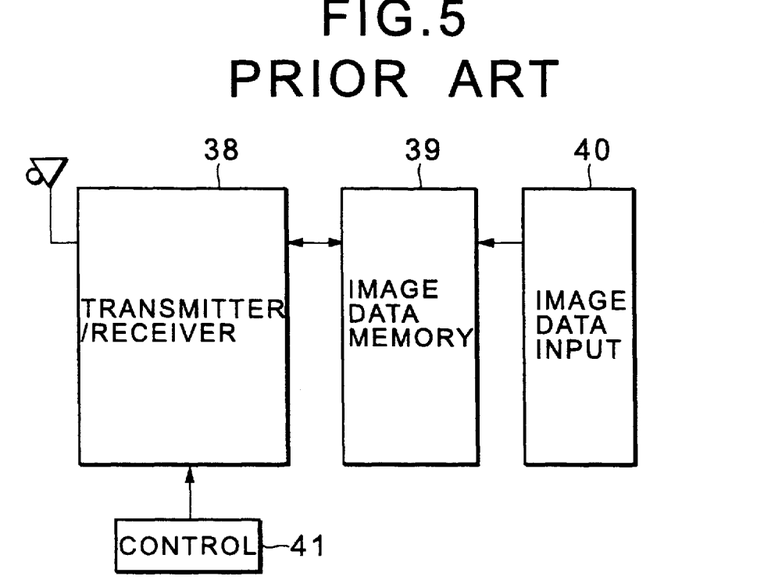
FIG. 5 is a block diagram illustrating part of the conventional image data transmission system of FIG. 2.

FIG. 5 is a block diagram illustrating a configuration of the transmitting station 26 or the fixed transmitting station 27 of the second conventional data transmission system. In this drawing, there are shown a transceiver 38, an image data memory 39, an image data input 40, and a control 41. Compressed image data is written from the image data input 40 to the image data memory 39. The transceiver 38 reads out the contents of the image data memory 39 based on an instruction from the control 41, and then an antenna sends out radio waves modulated with the memory contents.

Data transmitted from the transmitting station 26 or the fixed transmitting station 27 is compressed image data, and data is received at the receiver 28.

The received data is restored in the data processor 30.

Data transmitted from the transmitter 29 to the mobile transmitting station 26 or to the fixed transmitting station 27 is a response signal for reporting completion of a reception or resending of a request or the like to the mobile transmitting station 26 or to the fixed transmitting station 27. The restored image data is stored in the memory 31 and its contents are displayed on the display device 24.

Figure 6:
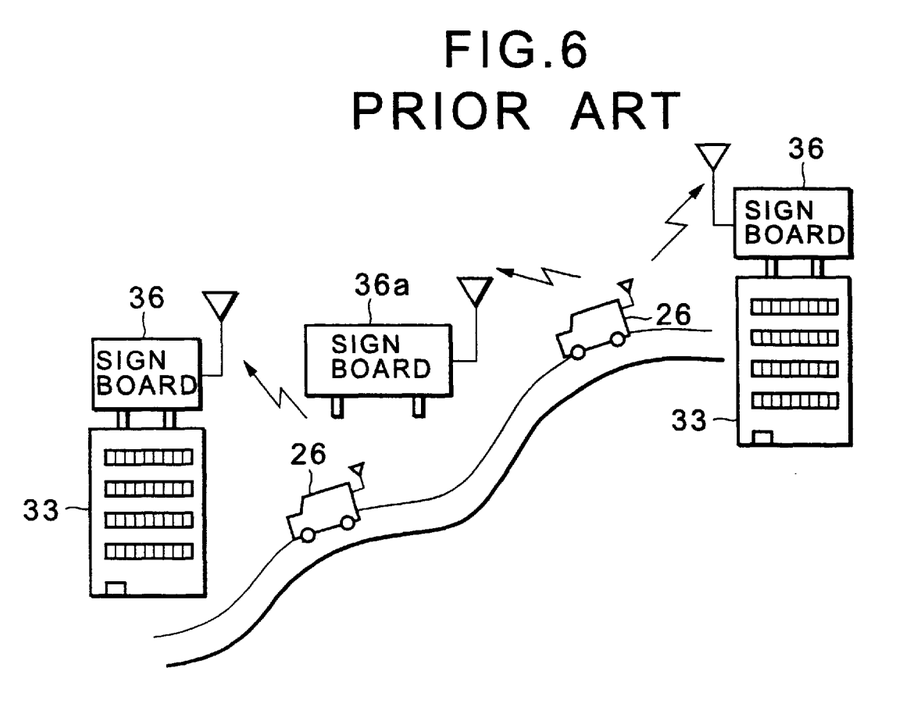
FIG. 6 is an example of an operation of an electronic signboard system of the conventional image data transmission system of FIG. 2.

FIG. 6 is a diagram of the operation of a second conventional transmission system, illustrating operation with a single mobile transmitting station 26 shown in two locations. The mobile transmitting station 26 moves on a road while transmitting display information in the neighborhood of an electronic signboard device 36 installed on a roof of a building 33 or a independent electronic signboard device 36a. The transmissions change the contents of the display simultaneously or sequentially. Two different positions of the mobile transmitting station 26 are shown in FIG. 6.

As described, in the first conventional transmission system, an optical fiber is used as a transmission line for transmission of advertisement information (image information) from a transmitting means to a receiving means. This apparatus, however, requires installing optical fibers between the transmitting means and the receiving means, which is costly.

In the second conventional transmission system, advertisement information (image information) is transmitted from the transmitting means to the receiving means with a single mobile vehicle (car) used as the transmitting means that distributes advertisement information to the receiving means. The amount of advertisement information that can be stored in a memory of a car is limited, however. Therefore, if the car distributes advertisement information to a plurality of receiving means, separate cars are needed for respective receiving means. For example, in order to change advertisements in railroad stations, a plurality of cars must carry advertisement information to be displayed on the receiving means installed in the respective railroad stations, so there is a significant cost in distributing advertisements. In addition, when using a car, advertisement information may not be distributed at a desired time due to traffic conditions, creating a reliability problem.

SUMMARY OF THE INVENTION

It is an object of the present invention to provide a data transmission system and method for distributing image information to receiving means, such as electronic advertisement boards located in places where numerous displays are present, for example, in railroad stations, at low cost and with high reliability.

According to one aspect of the present invention, an image data transmission system comprises a plurality of mobile transceivers, each mobile transceiver including a memory for storing image data organized in sequential blocks; a stationary transceiver including a memory for storing image data received from the mobile transceivers; and control means connected to the stationary transceiver for determining which blocks of image data have been transmitted from the mobile transceivers to and stored in the stationary transceiver.

In a second aspect of the invention, the transmission system includes arrival detection means for detecting arrival and pausing of a mobile transceiver proximate the stationary transceiver and departure detecting means for detecting departure of a mobile transceiver, formerly pausing, from a position proximate the stationary transceiver, the arrival and departure detecting means being connected to the control means.

In yet another aspect of the invention, the control means, in response to detection of arrival and pausing of a mobile transceiver proximate the stationary transceiver by the arrival detecting means, causes the stationary transceiver to transmit a pointer signal to the mobile transceiver indicating which blocks of image data have already been stored in the memory of the stationary transceiver, the pointer signal causing the mobile transceiver to begin transmitting a block of image data stored in the memory of the mobile transceiver, but not in the memory of the stationary transceiver, to the stationary transceiver, the control means interrupting transmission of image data from the mobile transceiver in response to detection of departure of the mobile transceiver from proximate the stationary transceiver by the departure detecting means.

According to another aspect of the invention, a method of supplying image data to a stationary transceiver from mobile transceivers comprises moving a plurality of mobile transceivers sequentially past a stationary transceiver, each of the mobile and stationary transceivers including a memory for storing image data organized in sequential blocks; sequentially pausing each of the mobile transceivers proximate the stationary transceiver; transmitting to the stationary transceiver from a paused mobile transceiver, proximate the stationary transceiver, a block of image data not already stored in the memory of the stationary transceiver; upon resuming movement of a mobile transceiver from proximate the stationary transceiver, interrupting transmission of image data from the mobile transceiver to the stationary transceiver; and sequentially repeating the moving, pausing, transmitting, and interrupting steps until the memory of the stationary transceiver has received and stored all blocks of the image data.

Further, a method according to the invention includes detecting arrival and pausing of a mobile transceiver proximate the stationary transceiver; transmitting from the stationary transceiver to the mobile transceiver a pointer signal generated by a control unit connected to the stationary transceiver and indicating which blocks of the image data have already been stored in the memory of the stationary transceiver; in response to the pointer signal, transmitting a block of image data to the stationary transceiver from the mobile transceiver proximate the stationary transceiver and storing the transmitted block of image data in the memory in the stationary transceiver; and detecting departure of the mobile transceiver from proximate the stationary transceiver and interrupting transmission of image data from the mobile transceiver to the stationary transceiver.

DETAILED DESCRIPTION OF THE PREFERRED EMBODIMENTS

Figure 7:
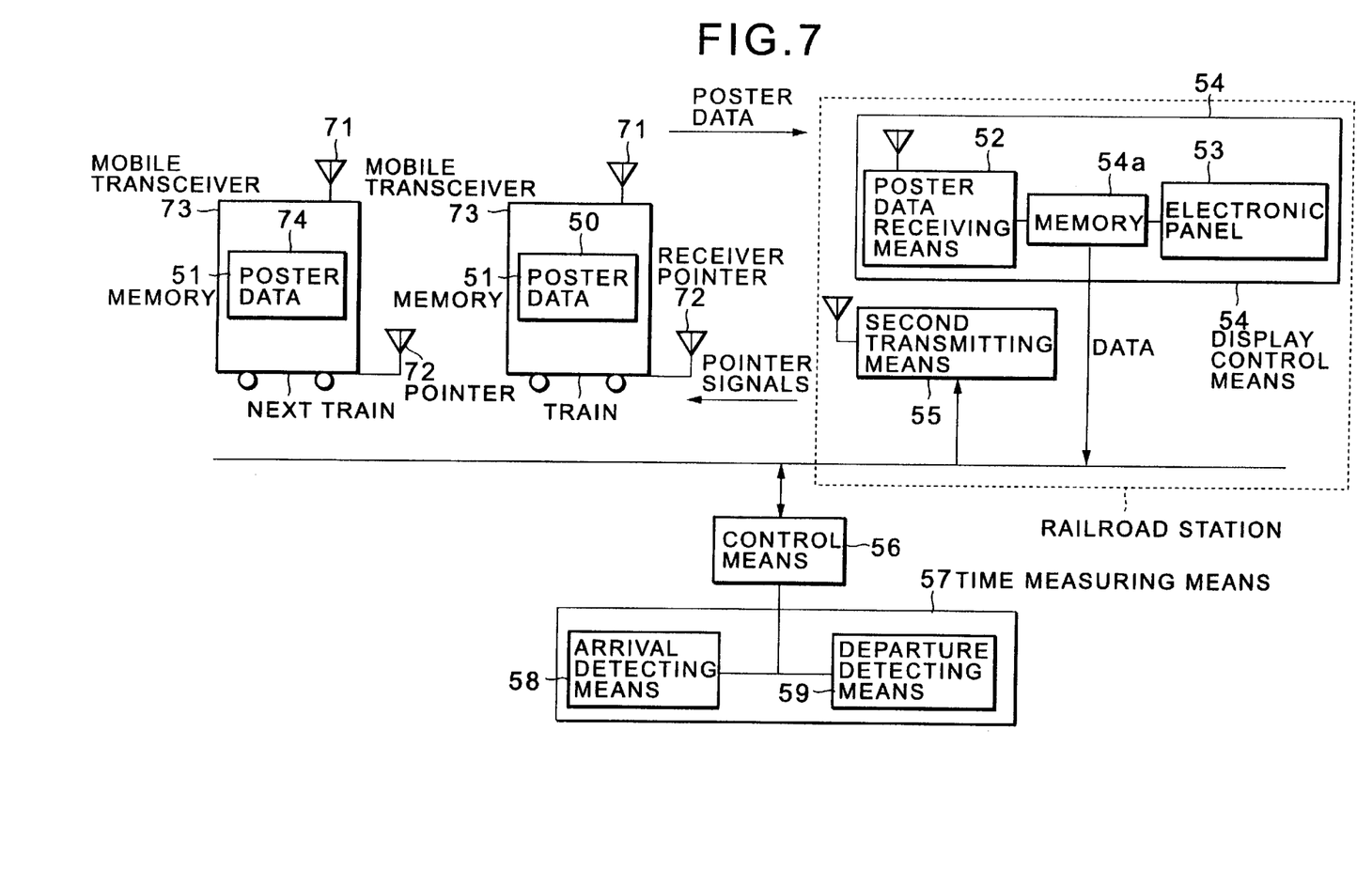
FIG. 7 is a diagram of an image data transmission system according to an embodiment of the present invention.

Referring to FIG. 7, there is shown a diagram of an image data transmission system illustrating an embodiment of the present invention. The system of FIG. 7 includes poster data (image data, image information, and image signals) 74 and 50, mobile vehicles 73, such as trains, and memories 51 installed in each train in which poster data is stored. Each of the memories 51 contains the poster data. The poster data 74 and the poster data 50 are the same data. The poster data 74 and 50 are distributed to each railroad station by the mobile vehicles 73. A first transmitting means 71 is used to send poster data 74 and 50 from the mobile vehicles 73 to each railroad station. Each mobile vehicle 73 includes a pointer signal receiver 72 for receiving pointer signals transmitted from a second transmitting means 55. The pointer signals indicate a poster data transmission starting position based on a calculation made in a control means 56 described below. Together, the transmitting means 71 and the receiver 72 on each vehicle 73 comprise a mobile transceiver.

The second transmitting means 55 is located in the railroad station for transmitting pointer signals to the mobile vehicles 73. Transmissions of poster data by the first transmitting means 71 is controlled based on the pointer signals. A poster data receiving means 52 in each railroad station receives poster data from each of the mobile vehicles 73. Together, the poster data receiving means 52 and second transmitting means 55 comprise a stationary transceiver.

An electronic panel 53 in a train station is connected to the poster data receiving means 52 in that station. A memory 54a connected to the poster data receiving means and the electronic panel 53 stores the poster data received from the mobile vehicles 73. When sufficient poster data from the mobile vehicles 73 is accumulated to display a picture on the electronic panel 53, display control means 54 displays the poster data 50 on the electronic panel 53.

Figure 11:
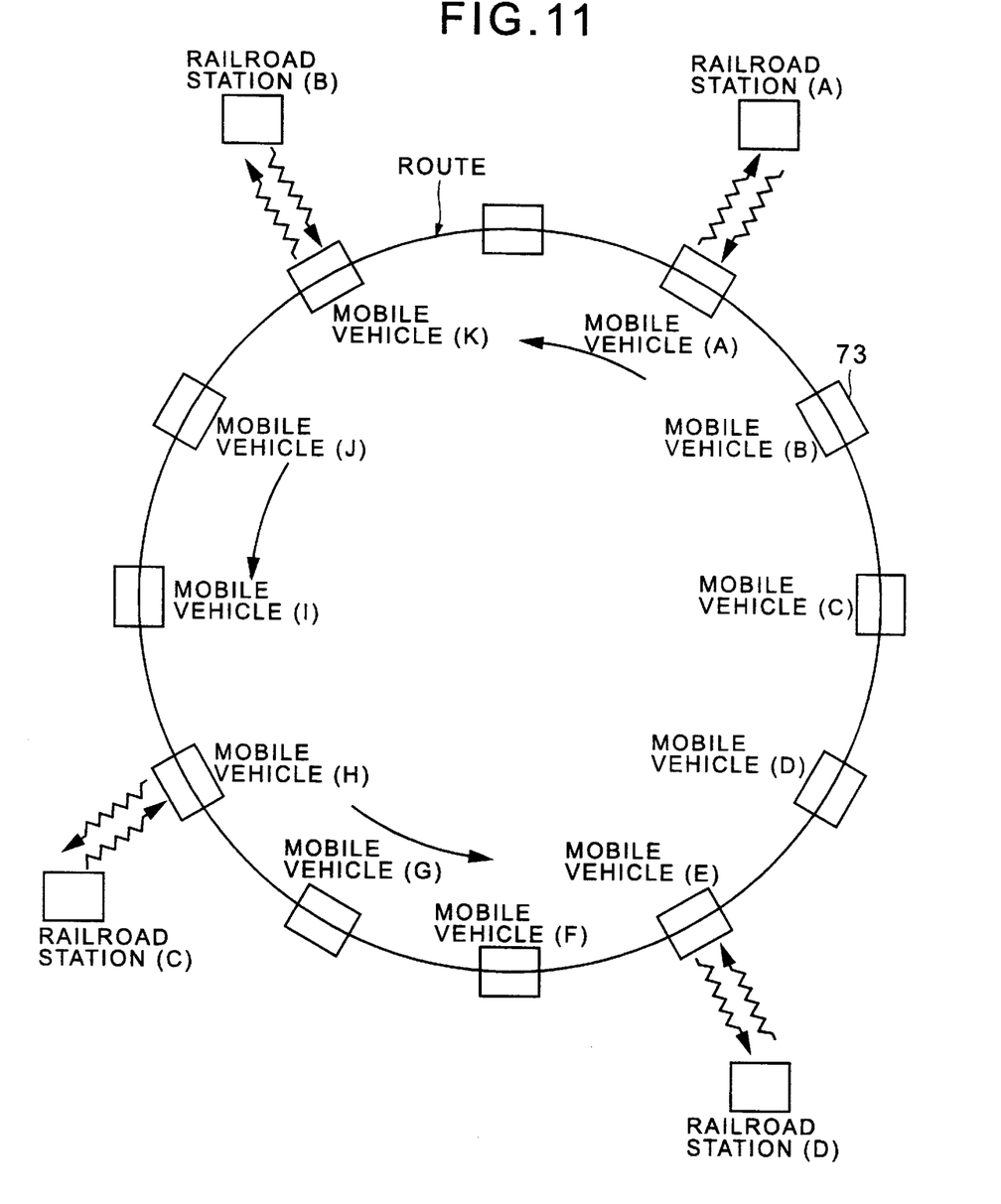
FIG. 11 is a diagram of a data transmission system according to an embodiment of the present invention.

FIG. 11 illustrates an interaction between the mobile vehicles 73, i.e., mobile transceivers, and each of the railroad stations, i.e., stationary transceivers. The stopping time of the train A at each station is short, so that train A cannot send all of the poster data to the railroad station A. The train A sends a part of the poster data to the railroad station A. The next train, train B, sends more of the poster data to the railroad station A. Train B may send the remainder of the poster data. If not, subsequent trains complete the sending of all of the blocks of the poster data.

Referring to FIG. 7, in order to prevent a train that follows train B from transmitting poster data (image data) that has already been transmitted to a display control means (railroad station A) by a train running ahead of train A, the second transmitting means 55, a control means 56, and a time measuring means 57, connected through the control means 56 to the second transmitting means, are used.

The time measuring means 57 detects the time when a train arrives at a particular railroad station and when the train is leaving the station in order to detect the time period during which the train 73 is stopped at the particular railroad station. Based on the detection by the time measuring means 57, the control means 56 detects the quantity of poster data transmitted from the respective trains 73 to the display control means 54 and calculates a transmission starting position for the poster data that the next train 73 must transmit to the display control means 54. Then, the control means 56 sends the transmission starting position to the second train. The transmission starting position is included in a pointer signal transmitted by the second transmitting means 55.

The display control means 54 comprises the poster data receiving station 52 for receiving the poster data transmitted from the trains 73, the electronic panel 53 for displaying the received poster data, and the memory 54a for accumulating the poster data from the poster data receiving means 52. The display control means 54 is used to receive the poster data from the train 73 and to display the poster data.

The time measuring means 57 comprises an arrival detecting means 58 for detecting when a train 73 has arrived at a particular railroad station and a departure detecting means 59 for detecting when the train 73 has started to leave that railroad station.

Next, a method of operation of the system according to an embodiment of the invention will be briefly described. In this embodiment, a plurality of trains, running on a railroad track, for example, a mass transit system, distribute poster data to railroad stations along this track. Accordingly, poster data (image data) having the same content and quantity is stored in a memory 51 in respective trains 73. The data needs to be stored in the memories in the manner explained below.

The train in this embodiment is not mainly intended for distribution of poster data (image data) but is intended for carrying passengers to a destination. Therefore, after two or three minutes at a station during which passengers get on and off the train, the train must leave for the next railroad station. In such a short time period, however, it is impossible to transmit even one static poster image completely from a single train A. Accordingly, in this embodiment, sequentially following trains respectively distribute sequential parts of the poster data (image data) to a particular railroad station, one train after another. In other words, an objective quantity of poster data (image data) is transmitted by each train, with a plurality of trains distributing sequential parts of the poster data (image data) sequentially.

As apparent from the foregoing description, complete poster data (image data) is transferred using a plurality of trains, i.e., mobile transceivers, and, therefore, it is required that poster data (image data) having the same content, organization, and volume be stored in each memory 51 in each of the trains, in advance.

Figure 8:
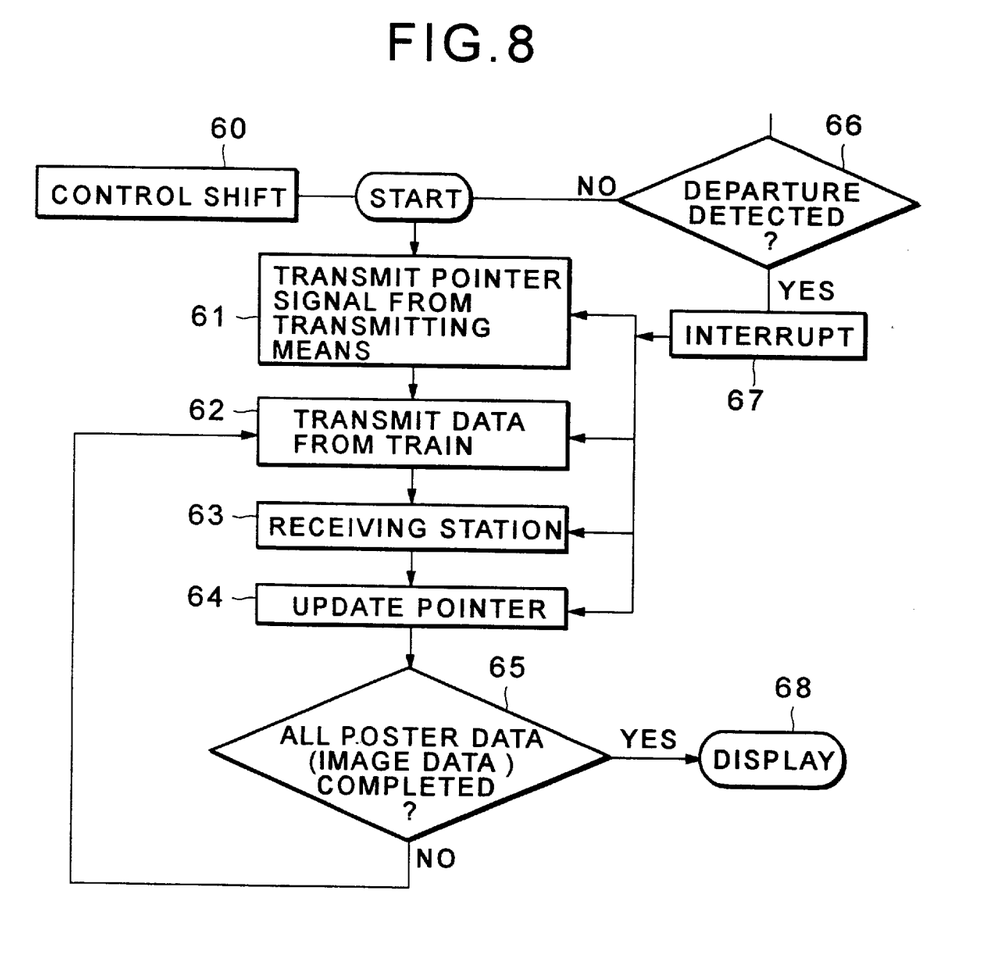
FIG. 8 is a flow chart of the operation of an image data transmission system according to an embodiment of the present invention.

An operation of the poster data (image data) transmission system will be described. FIG. 8 shows a processing flow after the train 73 has arrived at the railroad station A and detection of the departure of the train 73 from the railroad station A, which interrupts the processing.

Figure 9:
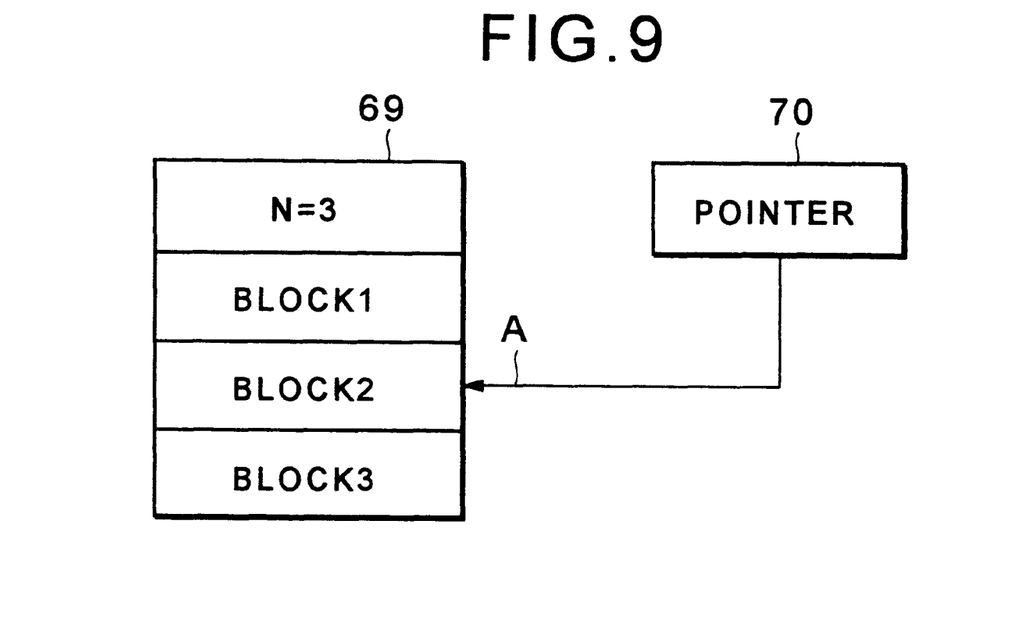
FIG. 9 is a diagram showing the relationship between a pointer and image data according to an embodiment of the present invention.

FIG. 9 shows a pointer signal transmitted from a second transmitting means 55 to the train 73. In this example, the poster data comprises three blocks. The pointer signal expresses the quantity of poster data not yet distributed after a train (mobile vehicle) A has distributed part of the poster data, e.g., block 1 but not block 2, to the railroad station A. The pointer signal is information that no train has yet distributed block 3 of the poster data. If the poster data includes four blocks, the first block specifies the number of blocks 68 of poster data. That number of blocks is three in the illustrated embodiment.

The control means 56 uses the pointer signals based on the quantity of poster data stored in the memory 54a, an arrival detected by the arrival detecting means 58, and a departure detected by the departure detecting means 59.

Figure 10:
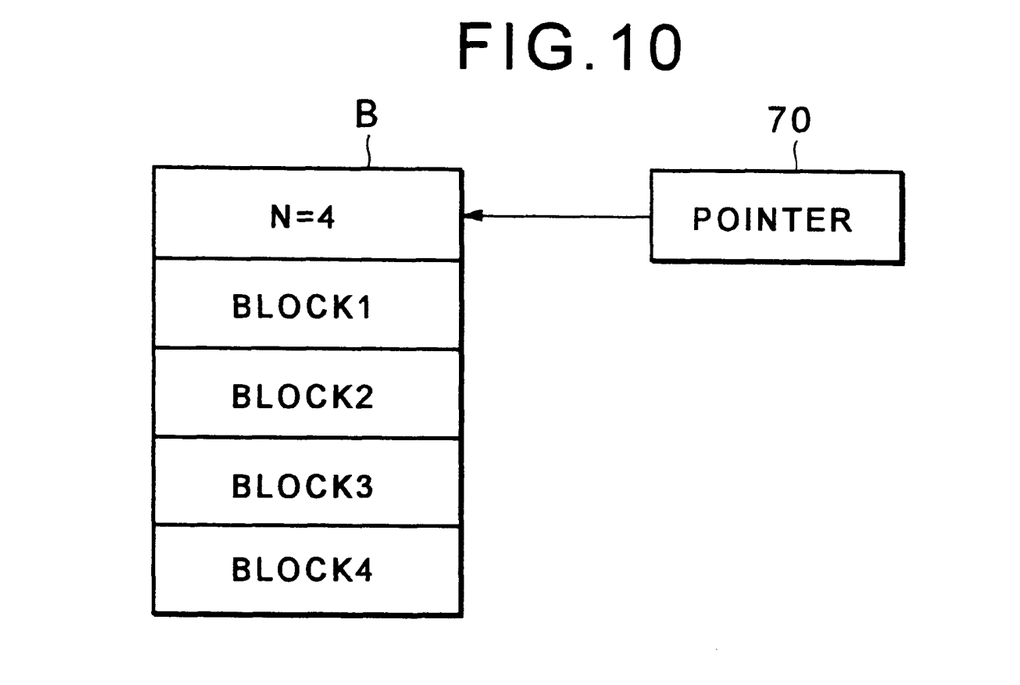
FIG. 10 is another diagram showing the relationship between a pointer and image data according to an embodiment of the present invention.

The processing flow of the data transmission system is described for each step. FIG. 10 illustrates data arranged including four blocks. A block 1 is pointed to in an initial state (a state in which data transmission has not yet been performed) indicating that the block 1 is to be processed next. When the arrival detecting means 58 of FIG. 7 detects that a train 73 has arrived at a railroad station, control shifts to the time measuring means 57 (step 60 in FIG. 8).

In step 61 (transmit pointer signal from transmitting means to train), prior to receiving poster data from the train, the second transmitting means 55 transmits a pointer signal to the train 73 to report a poster data transmission starting position B, shown in FIG. 10, to the train 73 (mobile vehicle A) which has arrived. The control means 56 calculates the transmission starting position. In step 62 (transmit data from train), the train 73 transmits poster data (block 1) from the position indicated by the pointer signal. In step 63 (receiving station), the poster data receiving means 52 receives the poster data in block units and the memory 54a stores the blocks of poster data.

In step 64 (update pointer), a pointer, calculated by the control means 56 to point to a block to be processed next, is transmitted by the second transmitting means 55. In step 65 (for displaying all poster data (image data)), it is determined whether the poster data transmission has been completed for display. At the time of completion of transmission of all poster data, the transmission is terminated. Until the transmission is completed, the control continually returns to the step 62.

If the pointer points to block 3, as shown in FIG. 9, the transmission has not yet been completed. Therefore, the processing is repeated from the step 62. In FIG. 9, when the pointer points to block 3 as the next position, processing terminates. The memory 54a then contains all of the poster data, i.e., the electronic panel 53 has received all the poster data for display of an image.

If the departure detecting means 59 of FIG. 7 detects that a train 73 has started to depart from the railroad station A during a repetition of the processing shown in steps 61 to 65, control shifts to a step 66 (departure detected) and the process shown in FIG. 8 is interrupted at step 67.

As shown in FIG. 9, if the train 73 has departed when the pointer is pointing to block 2, processing for the block 3 is performed after the next train 73 (mobile vehicle B) arrives at the railroad station A and while that train (mobile vehicle B) is stopped at the railroad station A. The memory 51 in the next train 73 (mobile vehicle B) contains the same data 50 as the memory in the previous train 73 (mobile vehicle A). The arrival at the railroad station of the train 73 (mobile vehicle B) is detected by the arrival detecting means 58 in FIG. 7 and the control of processing shifts to the step 60 in FIG. 8.

In the step 61, the pointer signal shown in FIG. 9 is transmitted to the next train 73 (mobile vehicle B) by the second transmitting means 55. The next train 73 (mobile vehicle B) transmits data not transmitted by the previous train 73 (mobile vehicle A), the block 3, to the poster data receiving means 52. In this manner, processing for the next train 73 (mobile vehicle B) is repeated in the same order as the processing for the previous train 73 (mobile vehicle A) but for different blocks of poster data.

In this embodiment, a block length is assumed to be determined so that at least one block included in the poster data can be transmitted while a train is stopped at the railroad station. After all the blocks have been transmitted to the memory 54a, the electronic panel 53 displays a complete picture of the poster at step 68 of FIG. 8.

In the foregoing description, reference has been made to a display on an electronic advertisement board (electronic panel 53). It is also possible, however, to display data on a plurality of electronic advertisement boards by using the poster data received by the poster data receiving means 52 and a distributor. Therefore, even if a plurality of electronic advertisement boards are installed in a railroad station, this embodiment can be used and an economical delivery system can be constructed.

Mobile vehicles include buses and ships, besides trains.

Image data is not necessarily transmitted from a mobile vehicle to a receiving station only while the mobile vehicle is stopped at a station. Image data may also be transmitted when the mobile vehicle approaches the station or as it departs from the station. In other words, when the mobile vehicle transmits image data, radio communication may also occur in the vicinity of a station.

The present invention, as described with respect to one embodiment, allows image data to be distributed reliably at low cost.

What is claimed is:

1. An image data transmission system comprising:
   a plurality of mobile transceivers, each mobile transceiver including a memory for storing image data organized in sequential blocks;
   a stationary transceiver including a memory for storing image data received from the mobile transeviers;
   control means connected to the stationary transceiver for determining which blocks of image data have been transmitted from the mobile transceivers to the stationary transceiver and have been stored in the stationary transceiver; and
   arrival detection means for detecting arrival and pausing of a mobile transceiver proximate the stationary transceiver and departure detecting means for detecting departure of a mobile transceiver, formerly pausing, from a position proximate the stationary transceiver, the arrival and departure detecting means being connected to the control means.

2. The image data transmission system of claim 1 wherein the mobile transceivers move sequentially past and pause proximate the stationary transceiver, a mobile transceiver proximate the stationary transceiver transmitting image data to the stationary transceiver under control of the control means.

3. The image data transmission system of claim 1 wherein the control means, in response to detection of arrival and pausing of a mobile transceiver proximate the stationary transceiver through the arrival detecting means, causes the stationary transceiver to transmit a pointer signal to the mobile transceiver indicating which block of image data have already been stored in the memory of the stationary transceiver, the pointer signal causing the mobile transceiver to transmit any blocks of image data stored in the memory of the mobile transceiver, but not in the memory of the stationary transceiver, to the stationary transceiver, the control means interrupting transmission of image data from the mobile transceiver in response to detection of departure of the mobile transceiver from proximate the stationary transceiver through the departure detecting means.

4. The image data transmission system of claim 3 wherein the control means updates the pointer signal for the stationary transceiver upon receipt of each block of image data by the stationary transceiver.

5. The image data transmission system of claim 1 wherein the plurality of mobile transceivers sequentially and repeatedly pass by the stationary transceiver.

6. The image data transmission system of claim 1 wherein the stationary transceiver includes at least one electronic panel for displaying the image data upon receipt and storage of all blocks of the image data from the mobile transceivers.

7. The image data transmission system of claim 6 wherein the stationary transceiver includes a receiver for receiving image data from a mobile transceiver and the memory in the stationary transceiver is connected between the receiver and the electronic panel for storing blocks of image data until all blocks are received and stored.

8. A method of supplying image data to a stationary transceiver from mobile transceivers, the method comprising:
   moving a plurality of mobile transceivers sequentially past a stationary transceiver, each of the mobile and stationary transceivers including a memory for storing image data organized in sequential blocks;
   sequentially pausing each of the mobile transceivers proximate the stationary transceiver;
   transmitting to the stationary transceiver from a paused mobile transceiver, proximate the stationary transceiver, a block of image data not already stored in the memory of the stationary transceiver;
   upon resuming movement of a mobile transceiver from proximate the stationary transceiver, interrupting transmission of image data from the mobile transceiver to the stationary transceiver; and
   sequentially repeating the moving, pausing, transmitting, and interrupting steps until the stationary transceiver has received and stored all blocks of the image data.

9. The method of claim 8 including:
   detecting arrival and pausing of a mobile transceiver proximate the stationary transceiver;

transmitting from the stationary transceiver to the mobile transceiver a pointer signal generated by a control unit connected to the stationary transceiver and indicating which blocks of the image data have already been stored in the memory of the stationary transceiver;

in response to the pointer signal, transmitting a block of image data to the stationary transceiver from the mobile transceiver proximate the stationary transceiver and storing the transmitted block of image data in the memory in the stationary transceiver; and detecting departure of the mobile transceiver from proximate the stationary transceiver and interrupting transmission of image data from the mobile transceiver to the stationary transceiver.

10. The method of claim 9 including, after transmission of each block of image date from a mobile transceiver to the stationary transceiver, updating the pointer signal.

11. The method of claim 8 including moving the mobile transceivers and repeatedly past the stationary transceiver.

12. The method of claim 8 including, after the memory in the stationary transceiver has received and stored all blocks of the image data, displaying the image data visually.

* * * * *